United States Patent
Hauck

(10) Patent No.: US 7,838,783 B2
(45) Date of Patent: Nov. 23, 2010

(54) LEVER MECHANISM, PARTICULARY FOR A SCALE RECEIVER OF A SCALE THAT WORKS ON THE PRINCIPLE OF ELECTROMAGNETIC FORCE COMPENSATION

(75) Inventor: Timo Hauck, Kaiserslautern (DE)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 256 days.

(21) Appl. No.: 12/066,655

(22) PCT Filed: Sep. 8, 2006

(86) PCT No.: PCT/DE2006/001569

§ 371 (c)(1),
(2), (4) Date: Jul. 18, 2008

(87) PCT Pub. No.: WO2007/031054

PCT Pub. Date: Mar. 22, 2007

(65) Prior Publication Data

US 2009/0065265 A1    Mar. 12, 2009

(30) Foreign Application Priority Data

Sep. 13, 2005   (DE) .................. 10 2005 043 820

(51) Int. Cl.
*G01G 21/24* (2006.01)
(52) U.S. Cl. .............. 177/210 EM; 177/212; 177/229
(58) Field of Classification Search .......... 177/210 EM, 177/212, 229
See application file for complete search history.

(56) References Cited

U.S. PATENT DOCUMENTS

| | | | |
|---|---|---|---|
| 4,656,599 A * | 4/1987 | Knothe et al. ............... 177/212 |
| 5,315,073 A * | 5/1994 | Ast et al. .................... 177/212 |
| 6,365,847 B1 | 4/2002 | Muller et al. |
| 6,472,618 B1 | 10/2002 | Izumo et al. |
| 6,861,593 B2 * | 3/2005 | Kuhlmann et al. .... 177/210 EM |
| 7,432,458 B2 * | 10/2008 | Hauck ................. 177/210 EM |
| 7,495,186 B2 * | 2/2009 | Kuhlmann et al. .... 177/210 EM |
| 7,534,971 B2 * | 5/2009 | Kuhlmann et al. .... 177/210 EM |
| 2002/0038729 A1 | 4/2002 | Watabiki et al. |
| 2007/0125185 A1* | 6/2007 | Hauck ................. 73/862.621 |
| 2008/0029314 A1 | 2/2008 | Kuhlmann et al. |
| 2008/0029315 A1 | 2/2008 | Kuhlmann et al. |
| 2010/0224422 A1* | 9/2010 | Hauck ................. 177/210 EM |

FOREIGN PATENT DOCUMENTS

| | | |
|---|---|---|
| DE | 2 011 867 | 3/1970 |
| DE | 88 05 155.2 | 12/1988 |
| DE | 296 13 668 U1 | 3/1997 |
| DE | 199 23 207 C1 | 10/2000 |
| DE | 102 29 016 A1 | 2/2004 |
| EP | 0 518 202 B1 | 12/1992 |

OTHER PUBLICATIONS

Masuo et al., "Performance of Elastic Fulcrum in a Beam Type Balance," Instrument Society of America, 19th Annual ISA Conference and Exhibit (Oct. 12-15, 1964), New York, 12 pgs.

* cited by examiner

*Primary Examiner*—Randy W Gibson
(74) *Attorney, Agent, or Firm*—The Culbertson Group, P.C.

(57) ABSTRACT

A lever mechanism, particularly for a scale receiver of a scale that works on the principle of electromagnetic force compensation includes at least one lever which is connected to a stationary base body or an element connected to the base body. The at least one lever arm is connected to the base body or the element connected to the base body via an elastically deformable articulation which defines a swivel axis of the at least one lever. A load force ($F_L$), which corresponds to the weight force ($F_G$) or is derived therefrom, acts on a first lever arm of the at least one lever and generates on a second lever arm of the at least one lever a reaction three ($F_R$). The elastically deformable articulation comprises two thin, elastically deformable bending areas, which connect the lever to the base body or to the element connected to the base body. Each bending area is bendable in a direction that is perpendicular to a longitudinal extension plane defined by the geometry of the respective bending area, for the generation of a swivel motion of the at least one lever. The longitudinal extension planes of the bending areas enclose an angle ($\alpha$) that is not equal to zero, and a virtual swivel axis (D) of the at least one lever is defined by the two elastically deformable bending areas.

15 Claims, 5 Drawing Sheets

LEVER MECHANISM, PARTICULARY FOR A SCALE RECEIVER OF A SCALE THAT WORKS ON THE PRINCIPLE OF ELECTROMAGNETIC FORCE COMPENSATION

TECHNICAL FIELD OF THE INVENTION

The invention relates to a lever mechanism, particularly for a scale receiver of a scale that works on the principle of electromagnetic force compensation.

Lever mechanisms and scales that work on the principle of electromagnetic force compensation, and scale receivers appropriate for them, are known in numerous embodiments of great variety. To obtain a very accurate weighing signal, monolithic scale receivers are usually used, which present, compared to non-monolithic scale receivers, the advantage, among others, of excellent long-term stability. A multi-piece assembly, for example, made of steel springs, as described in DE 100 15 311 A1, is no longer used by the leading manufacturers in scale technology and can be considered "obsolete technology."

Monolithic scale receivers can be manufactured in different ways, particularly by milling or erosive processing. DE 199 23 207 C1 shows, for example, a complex three-dimensional structure, where the desired high magnification ratio is implemented with three successively arranged angular levers. To reduce the construction size, in this structure, certain levers or lever arms or coupling elements are distributed symmetrically with respect to a projecting part of the stationary base body, which protrudes between these levers or lever arms or coupling elements. The protruding part of the base body here also forms a support for certain levers or lever arms or coupling elements. In spite of the complexity of this structure, it is chosen so that it can be manufactured monolithically in one body.

On the other hand, an erosive manufacture of a monolithic scale receiver as a rule allows only a two-dimensional structure. A scale receiver manufactured in this way is represented, for example, in EP 0 518 202 B1. This describes an embodiment of a ternary magnifying scale receiver, where the last lever arm of the last of the three series-connected levers can be screwed laterally to the monolithically manufactured base body.

US 2002/0038729 A1 describes an assembled scale receiver with two magnifying stages, where a monolithically manufactured structure, which implements the two levers, is inserted in an also monolithically manufactured parallel drive rod structure and is connected to the latter.

However, the problem with all these known monolithically manufactured magnifying structures of scale receivers is that several series-connected levers are required to implement high magnifying ratios, because the articulations that form the given swivel axis for the lever in question cannot be moved as close as possible, for manufacturing/technical reasons, to the positions in which the force has to be transmitted to the shorter lever arm, i.e., as a rule, the position in which the load force is to be transmitted to the lever. Thus, in known structures, the shorter lever arms cannot be reduced below a certain minimum value, which is a function of the geometry of the structure and of the finishing/technical parameters, for example, a function of the milling diameter required to generate an articulation-thin place in the monolithic material block or an available minimum milling diameter. Therefore, achieving a desired high magnification ratio necessarily requires an elongation of the longer lever arm. If this is not possible due to a preexisting maximum geometric expansion of the scale receiver in this spatial axis, then the only remaining possibility to achieve the desired magnification ratio is in-series connection of several levers.

However, in the implementation of a large magnification ratio, one must also take into consideration that correspondingly large forces are transmitted via the articulation to the stationary base body. Each elastically deformable articulation therefore must be of appropriately resistant design, particularly with regard to traction and/or pressure resistance. However, this leads, on the other hand, to high resistance to movement of the lever about the desired rotation axis, i.e., the elastically deformable articulation presents a high spring constant compared to the rotation motion about the desired rotation axis, so that, for this reason as well, magnification ratios of any desired magnitude cannot be achieved with a single lever.

Moreover, the known structures present the drawback of low stiffness of the elastically deformable articulation, which forms the swivel axis of a lever, in the translation direction perpendicular to the longitudinal extension plane of the articulation and in the rotation direction about axes parallel to the longitudinal extension direction of the articulation. In the case of undesired static or dynamic forces (generated by undesired accelerations, for example, vibrations), this leads to decreases in the measurement accuracy.

In practice, such an elastically deformable articulation presents a width (which does not necessarily have to be constant, although it is frequently constant to simplify the manufacture) that is larger by a multiple than the thinnest place (in the spatial axis perpendicular to the width of the articulation-defining spatial axis, where the thickness of the thinnest place will as a rule be constant over the entire width of the articulation), where the deformation for the generation of the swivel motion of the lever occurs by bending the articulation about an axis that runs parallel to the pathway of the thinnest place of the articulation. The bending area thus defines a longitudinal extension plane, where the bending motion occurs perpendicularly to this longitudinal extension plane.

Such a lever mechanism can naturally not be used for a scale receiver, but in application cases or devices where the magnification, reduction, or simple transmission of a force or of a motion between an input of the mechanism and an output of the mechanism is required.

The invention addresses the problem of producing a lever mechanism that presents a reduced sensitivity to undesired static and dynamic forces or accelerations in spatial directions and rotational directions, which do not correspond to the rotation direction of the desired swivel motions of the lever(s) of the lever mechanism, and that allows, with a smaller construction size, a higher magnification or reduction of the force or of the stroke path.

SUMMARY OF THE INVENTION

The invention is based on the knowledge that an elastically deformable articulation, which comprises two elastically deformable bending areas, whose longitudinal extension planes enclose an angle that is not equal to zero, preferably an angle in the range from 45 to 135°, presents, in the above explained translation and rotation axes, a considerably improved stiffness compared to articulations that consist in the known way of only a single bending area.

While in known, monolithically constructed scale receivers or their lever mechanisms the longitudinal extension plane of the single bending area of the elastically deformable articulation is always chosen to be parallel to the direction of the load force acting in each case on the lever to maintain as defined as possible a rotation axis for the swivel motion of the lever, the arrangement of the two bending areas of the articulation structure according to the invention can be chosen relatively freely. In each case, the result is a defined position of the rotation axis for the swivel motion of the lever in question.

Reference is made here to the fact that the at least one lever of the lever mechanism does not have to be connected directly to the base body or firm ground. A structure can also be provided where one lever is connected by means of the elastically deformable articulation to an element that is connected to the base body, for example, to an additional, pre-connected lever.

According to an embodiment, the two elastically deformable bending areas can present a width which is large compared to the thickness of the bending area in question at, in each case, its thinnest place in the direction perpendicular to the given longitudinal extension planes. The result is an improved bending stiffness of each individual bending area with respect to a bending stress about an axis that is perpendicular to the longitudinal extension plane in question. Due to the arrangement of the longitudinal extension planes of the two bending areas with an angle that is not equal to zero degrees, the resulting bending stiffness about all the axes, with the exception of the desired rotation axis for the swivel motions of the lever, is improved compared to a single bending area. The swivel motion is in fact markedly greater due to the proportional reception of the rotation forces by the two bending areas in the form of traction and pressure stresses than would be the case if the bending stiffnesses of the two bending areas about their longitudinal extension direction were added. As a result, the lever mechanism or the device that presents such a lever mechanism is drastically less sensitive to interfering forces or interfering accelerations, which are generated, for example, by corresponding movements of the lever mechanism or of the entire device, for example, shaking, vibration, etc.

In the preferred embodiment of the invention, the bending areas are formed symmetrically with respect to the longitudinal extension plane in question. In this way, a simpler design is achieved because such structures can in practice be developed merely with numerical methods today, and, on the other hand, the manufacture of such a structure becomes simpler, particularly in a machining or milling manufacture.

In the calculation of a whole series of different structures, it has been found that, particularly in articulation structures according to the invention that are designed symmetrically with respect to the longitudinal extension planes, the virtual swivel axis of the at least one lever is identical to the intersection line of the two longitudinal extension planes, or runs parallel to said line and presents a very small separation from it. Based on this knowledge, the design of such structures is made easier or simplified.

If the two bending areas that form the elastically deformable articulation are designed such that the bending direction (or the swivel axis) of each individual bending area is established by providing a straight-line, thinnest place, then the swivel axes obviously have to run parallel.

According to an embodiment, the bending areas can be provided such that the plane that bisects the angle, that is enclosed by the longitudinal extension planes, and that also runs through the virtual swivel axis or the intersection line of the two longitudinal extension planes, runs perpendicularly to the direction of the load force. This geometry offers the advantage that the position of the virtual swivel axis relative to the position of the engagement points of the load force or of the reaction force can be determined by appropriate selection and establishment of the angle that is enclosed by the longitudinal extension planes. In particular, it is possible to allow the short lever arm to become very small, and thus generate a large magnification ratio.

According to another embodiment, the bending areas can also be provided such that the plane that bisects the angle enclosed by the longitudinal extension planes, where said planes also run through the virtual swivel axis, runs parallel to the direction of the load force.

In an overall or at least to an appropriate extent monolithically constructed scale receiver, the load force can be transmitted over an additional thin, elastically deformable bending area to the lever, where the bending area is designed such that its longitudinal extension plane, in which the direction of the force transmission runs, runs parallel to the virtual swivel axis. If the bending direction of the bending area or the swivel axis in question is defined by a straight-line, thinnest place, then this swivel axis must run parallel to the virtual swivel axis of the lever in question.

The bending area for transmitting the load force can here be provided such that, if needed (i.e., if appropriate forces occur), an elastic bending of the bending area in the area of the intersection line of the longitudinal extension plane with the plane defined by the imagined lever arm and the virtual swivel axis occurs. The imagined lever arm here is determined as the separation between the virtual swivel axis and the longitudinal extension plane of the bending area.

This geometry has the advantage that if forces occur that lead to a bending of the bending area, by which the load force is introduced, and thus lead to a change in the direction in which the load force is introduced on the lever, the (imagined) lever arm remains substantially constant.

Naturally, the reaction force can also be transmitted by an additional thin, elastic deformable bending area to the lever, where the bending area is designed so that its longitudinal extension plane, in which the direction of the force transmission runs, runs parallel to the virtual swivel axis. If the bending direction or the swivel axis of the bending area is defined again as a straight-line, thinnest place, then this swivel axis as well must run parallel to the virtual swivel axis of the lever in question.

This bending area for the transmission of the reaction force can here also be provided such that, if needed (i.e., if corresponding forces occur), an elastic bending of the bending area in the area of the intersection line of the longitudinal extension plane with the plane defined by the imagined lever arm and the virtual swivel axis occurs. The imagined lever arm is here again determined as the separation of the virtual swivel axis from the longitudinal extension plane of the bending area. As explained above in connection with a corresponding introduction of the load force, the result is again the advantage of a lever arm that is independent of the angle of the introduction of the reaction force.

According to an embodiment of the invention, one or both bending areas of the elastically deformed articulation can be connected via a coupling element to the base body.

Here, it is preferred to provide, between the coupling element and the base body, an additional bending area, whose longitudinal extension plane is identical with the longitudinal extension plane of the bending area of the elastically deformable articulation, with which the coupling element is connected to the lever.

BRIEF DESCRIPTION OF THE DRAWINGS

The invention is explained in greater detail below with reference to the embodiment examples represented in the drawing. Shown in the drawing are.

DESCRIPTION OF ILLUSTRATIVE EMBODIMENTS

Figure 1:
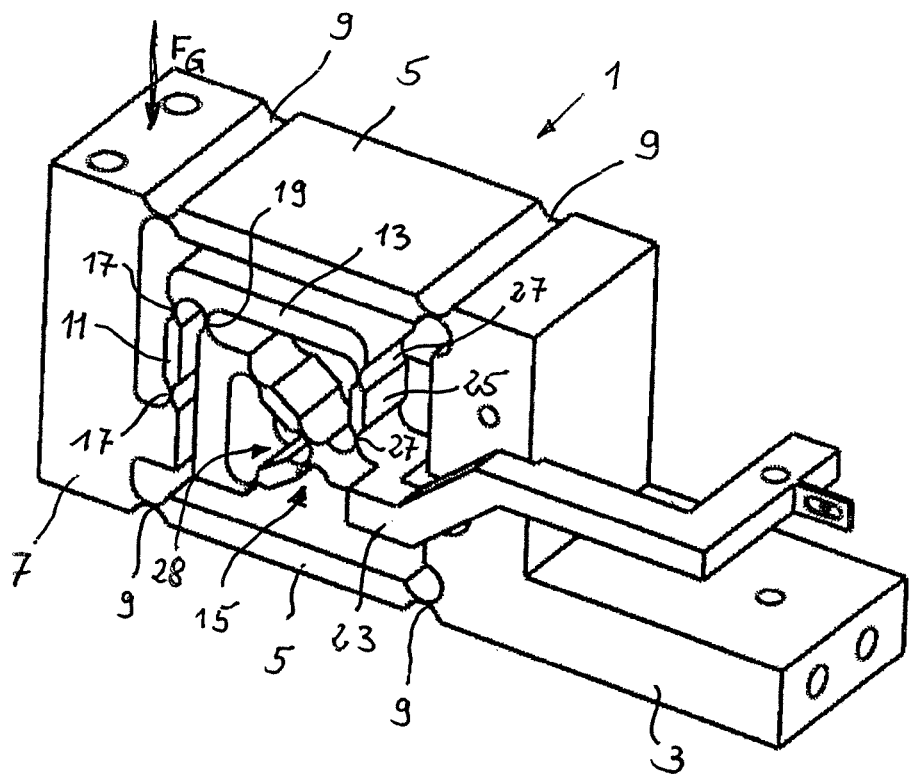
FIG. 1, a perspective view of a monolithic scale receiver of a first embodiment of the invention with a two-stage lever mechanism.

The scale receiver 1 represented in FIG. 1 is of monolithic design. In this form, it can be manufactured, for example, by machining processing of a material block, particularly by milling and boring. The scale receiver 1 comprises a base body 3 that can be mounted, for example, rigidly in the housing of a scale. The base body 3 is connected to a load receiving element 7 via two arms or parallel linkers 5 that run parallel, where the arms 5 in each case are connected via an elastically deformable articulation 9 to the stationary base body 3 and the load receiving element 7. The load receiving element 7 can be connected to a receiving device for a material (not shown) to be weighed.

A weight $F_G$ acting on the load receiving element 7 leads to a deflection of the parallel linkers 5 and to a movement of the load receiving element 7 in the direction of the weight force 7.

Figure 2:
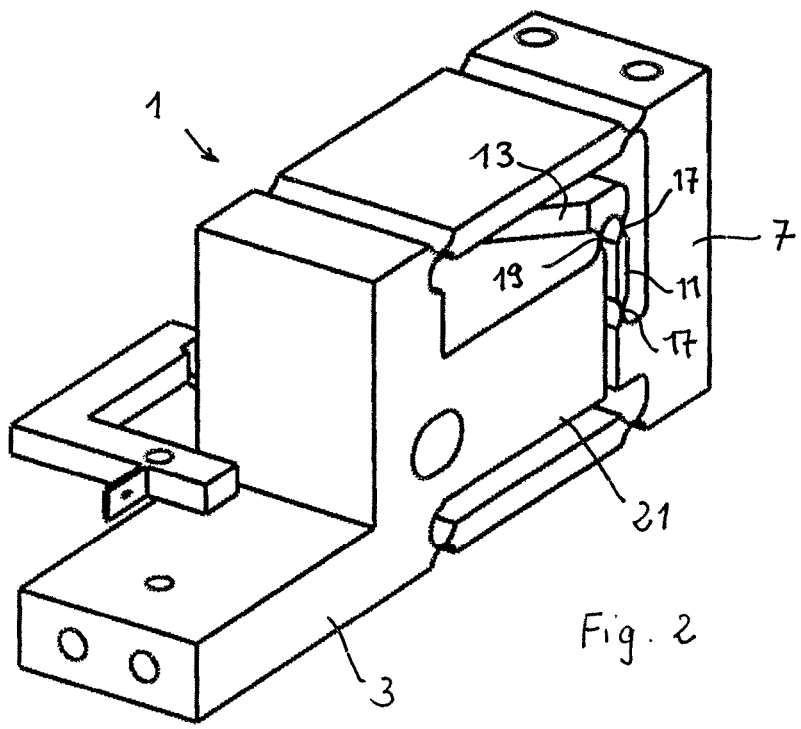
FIG. 2, an additional perspective view of the monolithic scale receiver in FIG. 1.

The load receiving element 7 is coupled via a coupling element 11 to the shorter lever arm of a first lever 13 of a two-stage lever mechanism 15. The coupling occurs in turn in each case by an elastically deformable articulation 17 at both ends of the coupling element 11. As can be seen in FIG. 2, the coupling element 11 in the represented embodiment extends over the entire width of the scale receiver 1. The lever 13 is connected via an elastically deformable articulation 19, which also extends over the entire width of the scale receiver 1, to an area 21 that protrudes between the parallel linkers 5 (FIG. 2) of the base body 3. The longer lever arm of the lever 13 narrows starting from the entire width in the vicinity of the articulation 19 until it reaches its end area in such a way that it can be coupled, via a coupling element 25 that is arranged inside the width of the scale receiver 1 laterally next to the protruding area 21 of the base body 3, with the shorter lever arm of a second lever 23. This second lever 23 is designed as a single-arm lever. The coupling occurs in turn in each case by an elastically deformable articulation 27 provided at the ends of the coupling element 25. The lever 23 or its longer lever arm is guided laterally past the base body 3 into its end area. If one uses the scale receiver here in a scale that works on the principle of electromagnetic force compensation, then the device can be used for the generation of the weighing signal (not shown).

The lever 23 is coupled via an articulation 28, which can be called a star articulation, with the protruding area 21 of the base body. The star articulation, whose structure, functioning and additional properties are explained below, presents, in comparison to a simple elastically deformable articulation, a drastically improved stiffness in all spatial directions and rotation directions with the exception of the desired rotation direction to allow the swivel motion of the lever 23. As a result, the one-sided design of the second lever 23 is made possible and simultaneously a high measurement accuracy and long-term stability of the scale receiver 1, as well as a high insensitivity to undesired static and dynamic interfering forces that act from outside on the scale receiver 1, are ensured.

Figure 3:
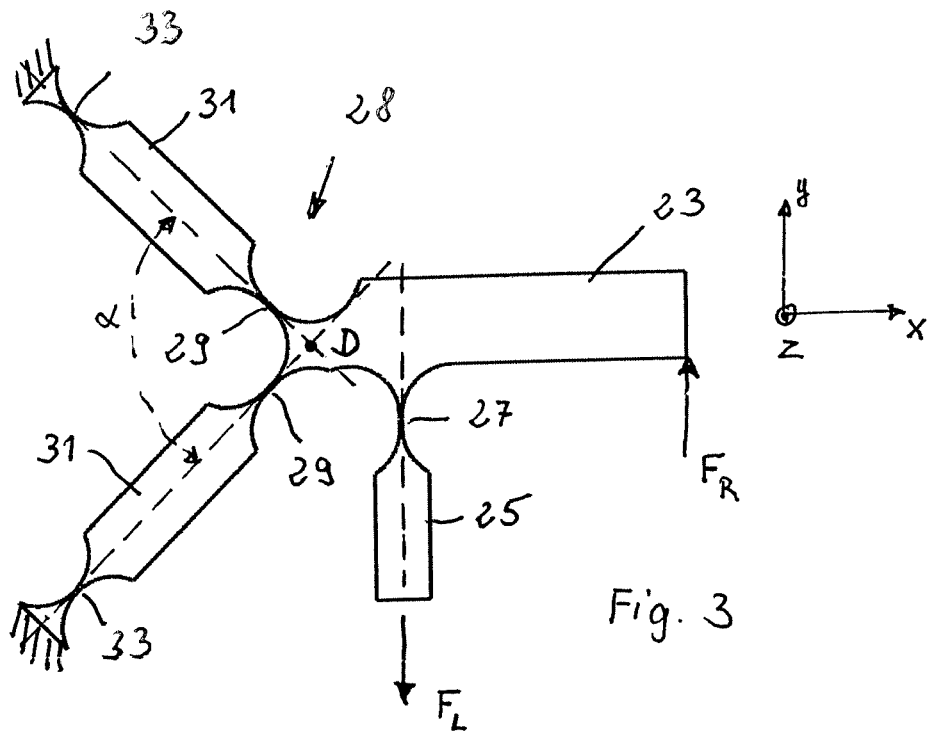
FIG. 3, a schematic representation of a structure of a single-sided lever of a lever mechanism of a scale receiver, which lever is coupled by means of a star articulation to the base body.

The principle of the star articulation 28 is represented in FIG. 3. The load force $F_L$, which acts via the coupling element 25 on the short lever arm of the lever 23, where said load force is obtained particularly from the weight force $F_G$, the lever ratio of the first lever 13, and the properties of the elastically deformable articulations 9 and 19, would effect a swivel motion of the lever 23 about a virtual swivel axis D, without the generation on the longer lever arm of a reaction force $F_R$ acting as a counterweight of the lever, for example, by means of an installation for electromagnetic force compensation.

The virtual swivel axis D in such complicated structures can today in practice be determined only by numerical means. Corresponding examinations have shown that the virtual swivel axis D is identical to the intersection line of the longitudinal extension planes of the bending areas 29 of the star articulation 28 (or at the very most presents a small separation from the intersection line), by means of which the lever 23 are coupled via the coupling elements 31 with a firm ground, i.e., the base body 3. The coupling of the coupling elements 31 with a firm ground occurs here in turn via bending areas 33 whose longitudinal extension planes are identical to the longitudinal extension planes of the bending areas 29.

Because the longitudinal extension planes enclose an angle α, the star articulation 28 presents a clearly improved stiffness in all translation spatial directions x, y, z, compared to a simple, elastically deformable articulation, which presents only a single bending area. In addition, the result is a drastically improved stiffness against rotation movements about the x axis and the y axis, because corresponding rotation forces in a substantial proportion are taken up as traction and pressure forces in the bending areas 29 and 33 and not only as shearing forces, as in the case of the connection of the lever 23 via a single bending area, whose longitudinal extension plane runs parallel to the direction of the introduction of the load force $F_L$ (this pathway of the longitudinal extension plane is obligatory in the case of the use of a single bending area, because otherwise the resulting swivel axis is not sufficiently defined).

In the structure of a star articulation 28 represented in FIG. 3, the thin places or bending areas 27 and 29 can be manufactured in a simple way by a machining process, for example, by boring. For this purpose, only five bores are required, because the facing surfaces of the thin places 29 can be manufactured with a single bore. Alternatively, it is obviously (as also in the case of all the other embodiment examples) possible to generate the structure with the help of thin cuts (erosive processing).

It is also possible to manufacture the mutually facing surfaces of the thin places 29 and 27 with a single bore. However, here the position of the introduction of the load force $F_L$ can no longer be chosen freely, rather it is a function of the diameter of the bore. The lever ratio can be set to the desired value by the selection of the position of the virtual swivel axis D and the length of the longer lever arm.

The position of the virtual lever axis can, in the structure of the star articulation according to FIG. 3, be set by the appropriate selection of the angle $\alpha$ between the longitudinal extension planes of the bending areas 29. Here, it is clearly apparent in FIG. 3 that for smaller angles $\alpha$ than represented in the drawing, the smaller lever arm will always become smaller and accordingly the translation ratio will always become larger.

If the angle $\alpha$ falls below a certain value, then the virtual swivel axis comes to be located in the drawing to the right of the longitudinal extension plane of the bending area 27. In this case, a two-sided lever is produced, which, in comparison to the single-sided lever represented in FIG. 3, effects a direction reversal of the reaction force $F_R$.

Figure 4:
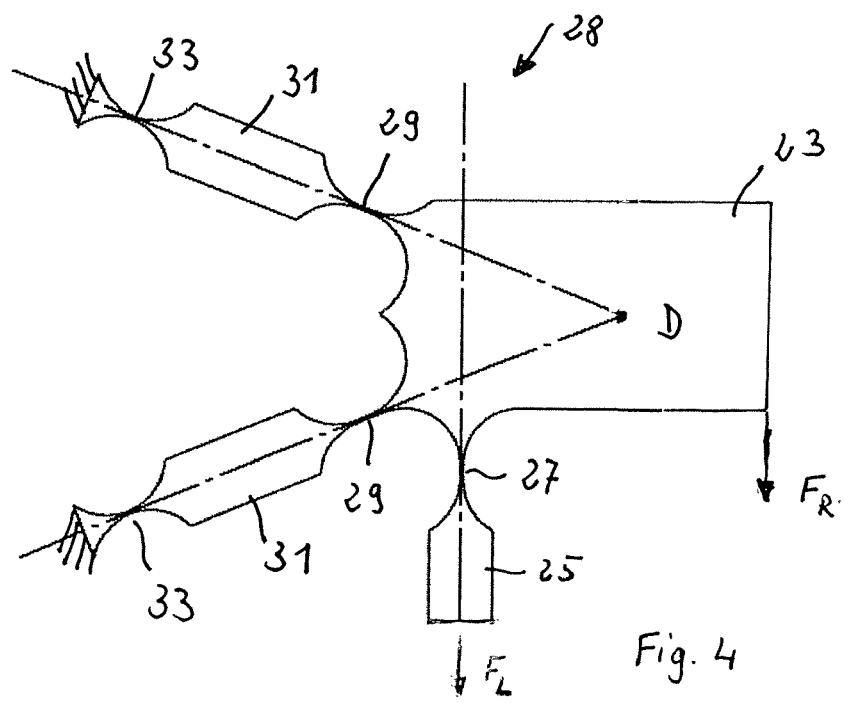
FIG. 4, a schematic representation of a structure of a two-sided lever of a lever mechanism of a scale receiver, which lever is coupled by means of a star articulation to the base body.

This situation is represented in FIG. 4. In this embodiment, the facing surfaces of the thin places 29 and 27 can be made with a single bore. On the other hand, for the manufacture of the mutually facing surfaces of the thin places 29, in each case separate bores are required.

Naturally, the lever 23 of the star articulation 28 in FIG. 3 can also run or be extended to the left and, for example, it can be led laterally (in the drawing) to the left past the star articulation 28. In this way it is also possible to implement a two-sided lever with the structure according to FIG. 3.

Figure 5:
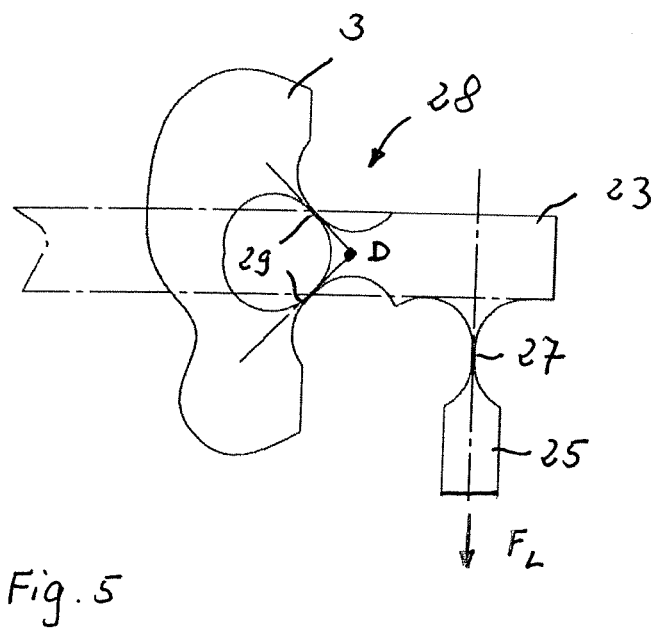
FIG. 5, a schematic representation of a structure of a two-sided lever of a lever mechanism of a scale receiver, which is coupled by means of a star articulation to the base body, with simplified connection to the base body.

Such a structure is represented in FIG. 5. The lever 23 is here implemented as a two-sided lever, where the reaction force engages on the left end, not represented, of the lever 23. In this structure of a star articulation 28, the lever 23 is coupled directly by means of two bending areas 29 to a firm ground, i.e., the stationary base body 3. These bending areas 29 are an elongated thin place, which is not manufactured simply by two lateral bores. This construction form is conceived for a space-saving arrangement of the translation lever. The coupling element provided between the two articulations between the two thin places in the previous embodiments is therefore completely omitted here. Like a coupling element, which is provided at both ends in each case via a bending area between the lever and the load receiving element or another pre-connected lever, the elongated thin place 29 has the advantage that no undesired forces are transmitted perpendicularly to the longitudinal extension plane of the thin place.

However, the embodiments of the structures represented in FIGS. 3 and 4 can also be modified in such a way that the lever 23 in each case is extended to the left. The latter in turn can be led laterally on the star articulation 28 to the left. However, an embodiment would also be conceivable in which the two coupling elements or the thin places 29 are in each case slid vertically upward or downward in the plane of the drawing, so that the support lever can run between the two thin places 29.

It should be noted here that in all the embodiments the support arm of the lever, i.e., the lever part on which the given reaction force $F_R$ engages, does not have to be embodied monolithically with the remaining lever. Rather, the entire support arm, or part thereof, can also be screwed, glued, or attached by any other material or positive connection securing method, in an appropriate area with the other part of the lever.

Figure 6:
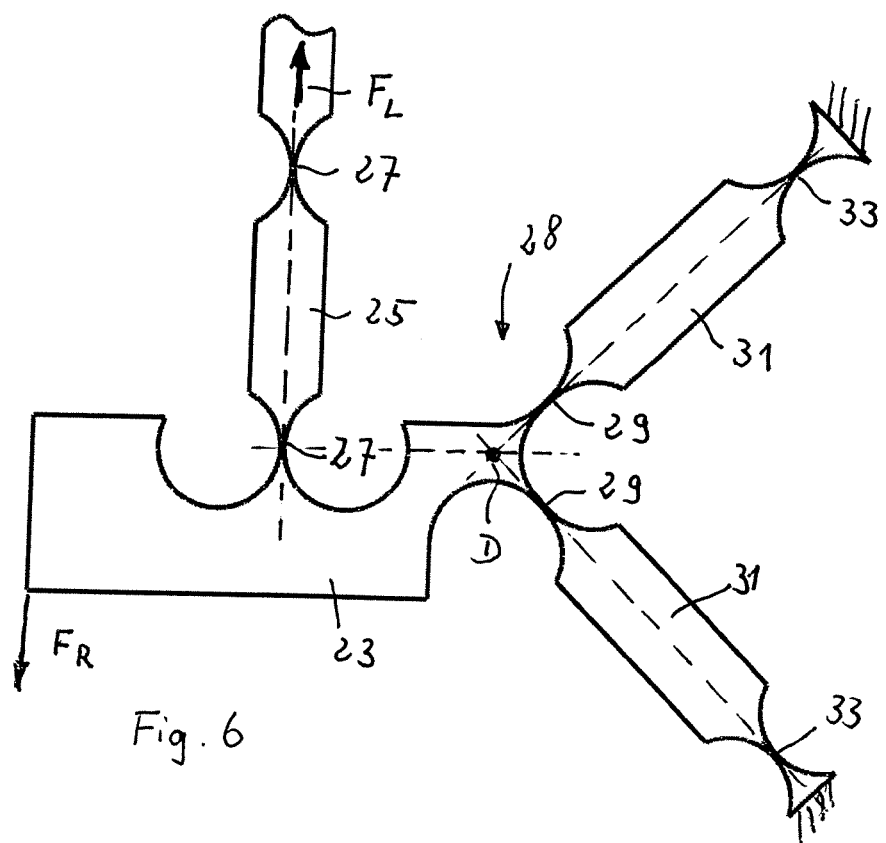
FIG. 6, a schematic representation of a structure of a two-sided lever of a lever mechanism of a scale receiver, which lever is coupled by means of a star articulation to the base body, with a load introduction which is not sensitive to tipping.

FIG. 6 shows an additional structure for a star articulation 28, which is similar to the structure represented in FIG. 3. However, this embodiment differs in that the (straight-line) pathway of the thinnest place of the thin place 27 for the coupling of the coupling element 25 lies in the intersection line of the longitudinal extension plane of the bending area or of the bending place 27 with the plane that runs through the virtual swivel axis D and on the plane that stands perpendicularly on the longitudinal extension plane of the bending area 27. This has the advantage that if the longitudinal extension plane of the bending area 27 or of the coupling element 25 tips, the imagined lever arm remains constant.

Figure 7:
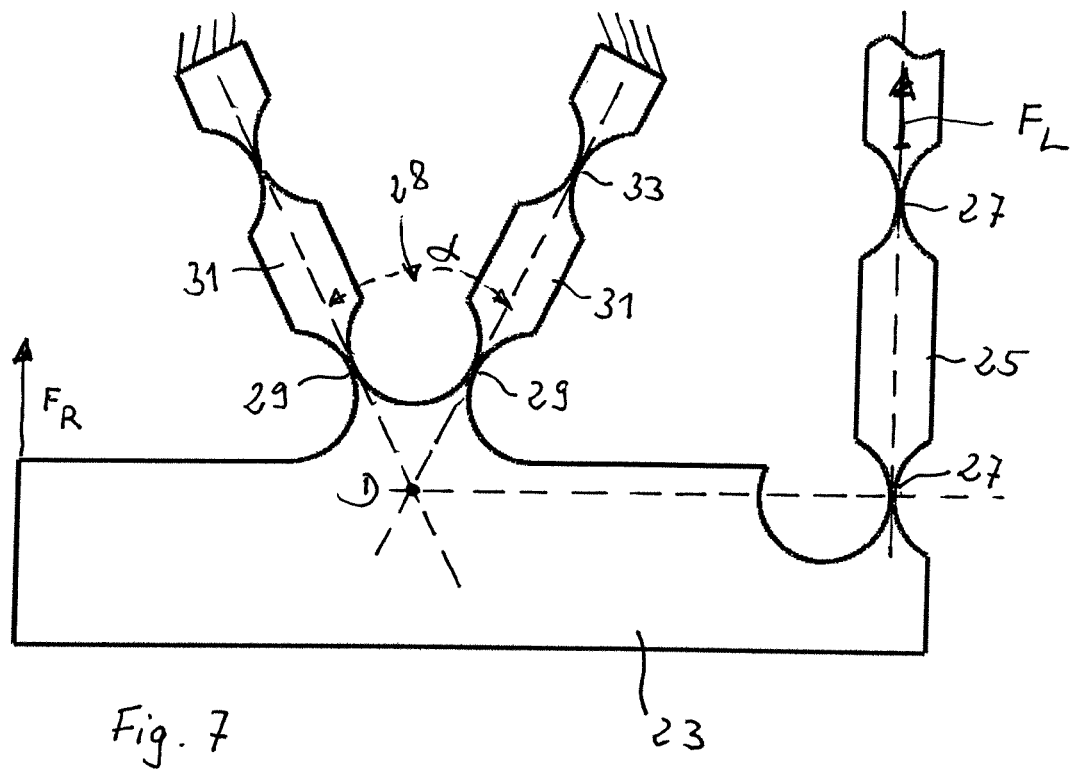
FIG. 7, a schematic representation of an additional structure of a two-sided lever of a lever mechanism of a scale receiver, which lever is coupled by means of a star articulation to the base body, with a load introduction that is not sensitive to tipping.

This applies also to the structure of a star articulation 28, which is represented in FIG. 7. Here, the lever 23 is connected via the coupling elements 31 to a firm ground. In this structure, the plane that bisects the angle $\alpha$ between the longitudinal extension planes of the bending area 29 stands parallel to the longitudinal extension plane of the bending area 27 by means of which the load force $F_L$ is coupled. The bending area 27 is again arranged such that if there is a tipping of the longitudinal extension plane and thus of the load introduction direction, the imagined lever arm does not change.

It should be pointed out that the two bending areas 29 of a star articulation 28 do not necessarily have to be provided in any symmetrical way with respect to the lever 23, as is the case in the structures according to FIGS. 1-7. Rather, the longitudinal extension planes can be chosen freely in a way that is found to be advantageous for the desired construction form. For example, one can also choose a bending area 29 whose longitudinal extension plane is parallel to the longitudinal extension plane of the bending area 27 that introduces the load force and whose other bending area 29 is such that the result is the virtual swivel axis in the desired position. The angle $\alpha$ between the two longitudinal extension planes should moreover be chosen such that the stiffness is sufficiently high in the appropriate spatial or rotation directions.

Figure 8:
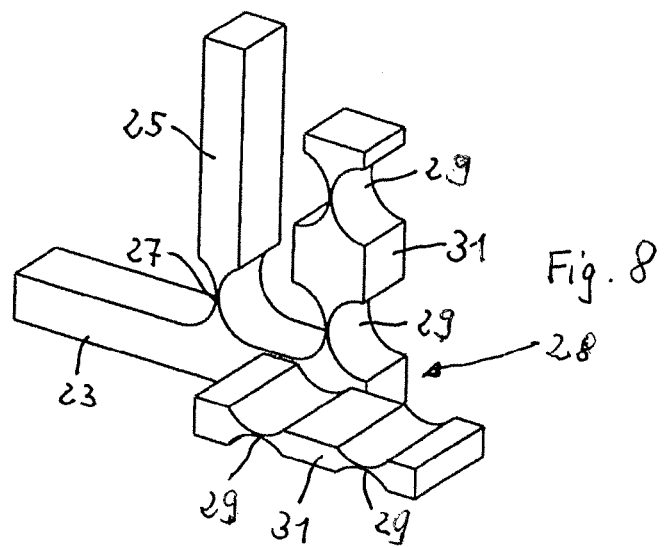
FIG. 8, a perspective representation of an additional structure of a star articulation with bending areas that are in a spatially offset arrangement.

FIG. 8 shows a perspective view of an embodiment in which the bending areas 29 of the star articulation 28 are offset and adjacent to each other. The longitudinal extension planes enclose an angle of 90°, where the virtual swivel axis coincides with the straight-line course of the thinnest place of the bending area 29 whose longitudinal extension plane lies parallel to the lever 23, coincides with it or is located at a small distance from it. As a result, a low overall stiffness of this lever translation system is achieved, with maximum safety against possible overloads.

The structures according to the schematic FIGS. 3-8 show the multiple possibilities with which such a star articulation can be used in practice. They allow, even in the case of a one-sided, asymmetric arrangement of a lever (outside the symmetry plane) of a scale receiver, as shown in FIGS. 1 and 2, a compact and stiff construction of the scale receiver where, simultaneously, a large gear up ratio can be achieved.

Figure 9:
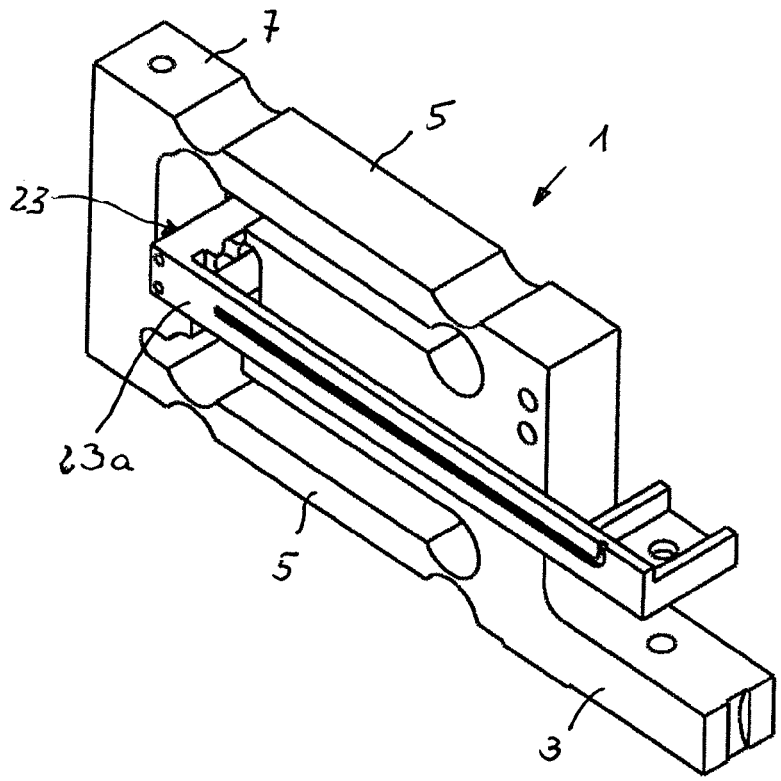
FIG. 9, a perspective view of a monolithic scale receiver of a second embodiment of the invention with a single-step lever mechanism.
Figure 10:
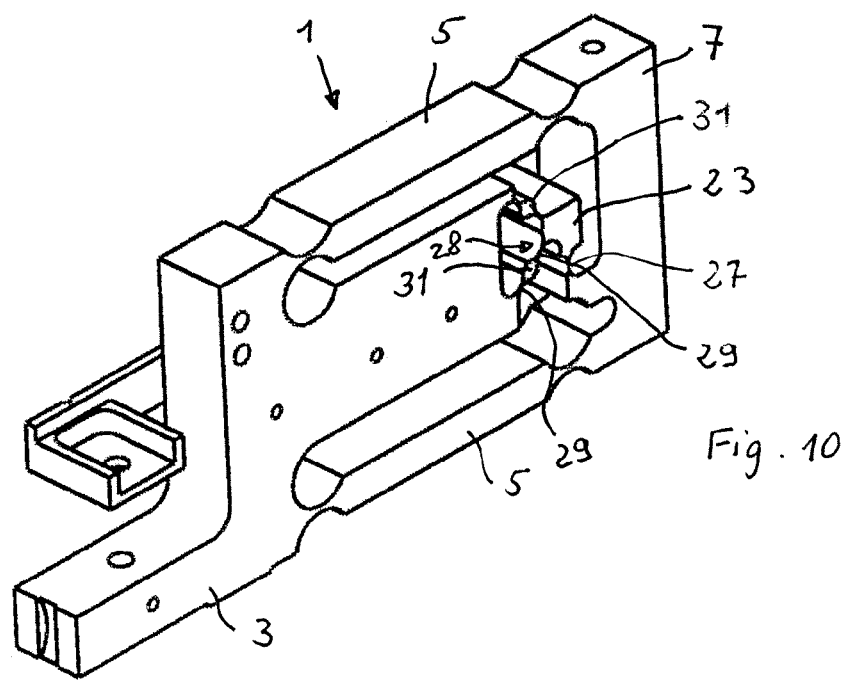
FIG. 10, an additional perspective view of the monolithic scale receiver in FIG. 8.

Finally, an additional embodiment for a scale receiver is described according to FIGS. 9 and 10, whose lever mechanism presents only a single lever. The scale receiver 1 presents the construction made of the base body 3, the parallel linkers 5 and the load receiving element 7, which has already been described in connection with the scale receiver according to FIGS. 1 and 2. The load receiving element 7 is connected via a bending area 27, which can be designed as an elongated bending area (see FIG. 5: here the bending areas 29 are designed as extended bending areas), to a lever 23. The lever 23 is connected via a star articulation 28, which comprises the coupling element 31 and the corresponding bending areas 29, to the area 21 of the base body 3 that protrudes between the parallel linkers 5. The structure of the star articulation 28 here corresponds largely to the structure represented in FIG. 6, where, as already explained, the load force is not introduced via a coupling element, but via an elongated thin place 27 on the lever 23.

As is apparent from FIG. 9, the part 23a of the lever 23, which part is led laterally past the base body, can be connected by screwing, welding or other appropriate connection forms to the remaining part of the lever, which is designed to form a single piece with a base body. The stiffness of the star articulation ensures, in spite of this asymmetric and simple construction, an excellent measurement accuracy and insensitivity to external interfering forces.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A lever mechanism including:
   (a) at least one lever and a base body;
   (b) a first lever arm of the at least one lever and a second lever arm of the at least one lever, wherein a load force acting on the first lever arm generates a reaction force on the second lever arm of the at least one lever;
   (c) an elastically deformable articulation connecting the at least one lever to the base body or an element connected to the base body, the elastically deformable articulation defining a swivel axis of the at least one lever and including two elastically deformable bending areas, each bending area having a respective first end area connected directly to the at least one lever and having a respective second end area connected directly or indirectly to the base body or the element connected to the base body;
   (d) wherein the geometry of each bending area defines a respective longitudinal extension plane and wherein each bending area is bendable in a direction that is perpendicular to its respective longitudinal extension plane for the generation of a swivel motion of the at least one lever; and
   (e) wherein the longitudinal extension plane of one of the bending areas converges toward the longitudinal extension plane of the other one of the bending areas so as to enclose an angle that is not equal to zero, and wherein the bending areas are arranged so as to define a virtual swivel axis of the at least one lever, the virtual swivel axis lying beyond the respective first end area of each bending area in the direction toward the at least one lever.

2. The lever mechanism of claim 1 wherein each of the two bending areas has a width that is large compared to the thickness of the respective bending area at its thinnest place in the direction perpendicular to the respective longitudinal extension plane.

3. The lever mechanism of claim 1 wherein each bending area is symmetrical with respect to its respective longitudinal extension plane.

4. The lever mechanism of claim 1 wherein the longitudinal extension plane of one of the two bending areas intersects with the longitudinal extension plane of the other one of the two bending areas along an intersection line that forms the virtual swivel axis of the at least one lever.

5. The lever mechanism of claim 1 wherein the plane which bisects the angle enclosed by the two longitudinal extension planes defined by the two bending areas and which also runs through the virtual swivel axis, runs perpendicularly to the direction of the load force acting on the at least one lever.

6. The lever mechanism of claim 1 wherein the plane which bisects the angle that is enclosed by the two longitudinal extension planes defined by the two bending areas and which also runs through the virtual swivel axis, runs parallel to the direction of the load force acting on the at least one lever.

7. The lever mechanism of claim 1 wherein the load force is transmitted via an elastically deformable load force bending area connected to the at least one lever, the load force bending area having a longitudinal extension plane that runs parallel to the virtual swivel axis.

8. The lever mechanism of claim 7 wherein the load force bending area is configured such that an elastic bending of the load force bending area occurs in the area of the intersection line of the longitudinal extension plane of the load force bending area with a plane that extends perpendicular to the longitudinal extension plane of the load force bending area and encompasses the virtual swivel axis.

9. The lever mechanism of claim 1 wherein the reaction force is transmitted to the at least one lever via an elastically deformable reaction force bending area and wherein the reaction force bending area is configured such that a longitudinal extension plane thereof, which contains the direction of the force transmission, runs parallel to the virtual swivel axis.

10. The lever mechanism of claim 9 wherein the reaction force bending area is configured such that an elastic bending of the reaction force bending area occurs in the area of the intersection of the longitudinal extension plane of the reaction force bending area with a plane that extends perpendicular to the longitudinal extension plane of the reaction force bending area and encompasses the virtual swivel axis.

11. The lever mechanism of claim 1 wherein one or both of the bending areas of the elastically deformable articulation are connected via a respective coupling element to the base body or the element connected to the base body.

12. The lever mechanism of claim 11 further including an additional bending area provided between a respective coupling element and the base body or the element connected to the base body, and wherein the longitudinal extension plane of the additional bending area is identical to the longitudinal extension plane of the bending area of the elastically deformable articulation with which the respective coupling element is connected to the at least one lever.

13. The lever mechanism of claim 11 further including an additional bending area provided between each coupling element and the base body or the element connected to the base body, and wherein the longitudinal extension plane of the respective additional bending area is identical to the longitudinal extension plane of the respective bending area of the elastically deformable articulation with which the respective coupling element is connected to the at least one lever.

14. The lever mechanism of claim 1 wherein the at least one lever is incorporated into a scale receiver for a scale that works on the principle of electromagnetic force compensation, and wherein lever mechanism magnifies or reduces a weight force to be determined.

15. The lever mechanism of claim 1 wherein the at least one lever is incorporated into a positioning device and wherein the lever mechanism converts the movement of an actor into a movement of a holder device for an element to be positioned.

* * * * *

UNITED STATES PATENT AND TRADEMARK OFFICE
CERTIFICATE OF CORRECTION

PATENT NO. : 7,838,783 B2  
APPLICATION NO. : 12/066655  
DATED : November 23, 2010  
INVENTOR(S) : Timo Hauck Page 1 of 1

It is certified that error appears in the above-identified patent and that said Letters Patent is hereby corrected as shown below:

Title Page, Item (57) Abstract:

At page 2, column 1, line 5: change "a reaction three" to read --a reaction force--.

Signed and Sealed this
Fifteenth Day of February, 2011

David J. Kappos
*Director of the United States Patent and Trademark Office*